Nov. 5, 1940.                A. M. MARKS                2,220,111
                          POLARIZING DEVICE
                        Filed Dec. 3, 1936
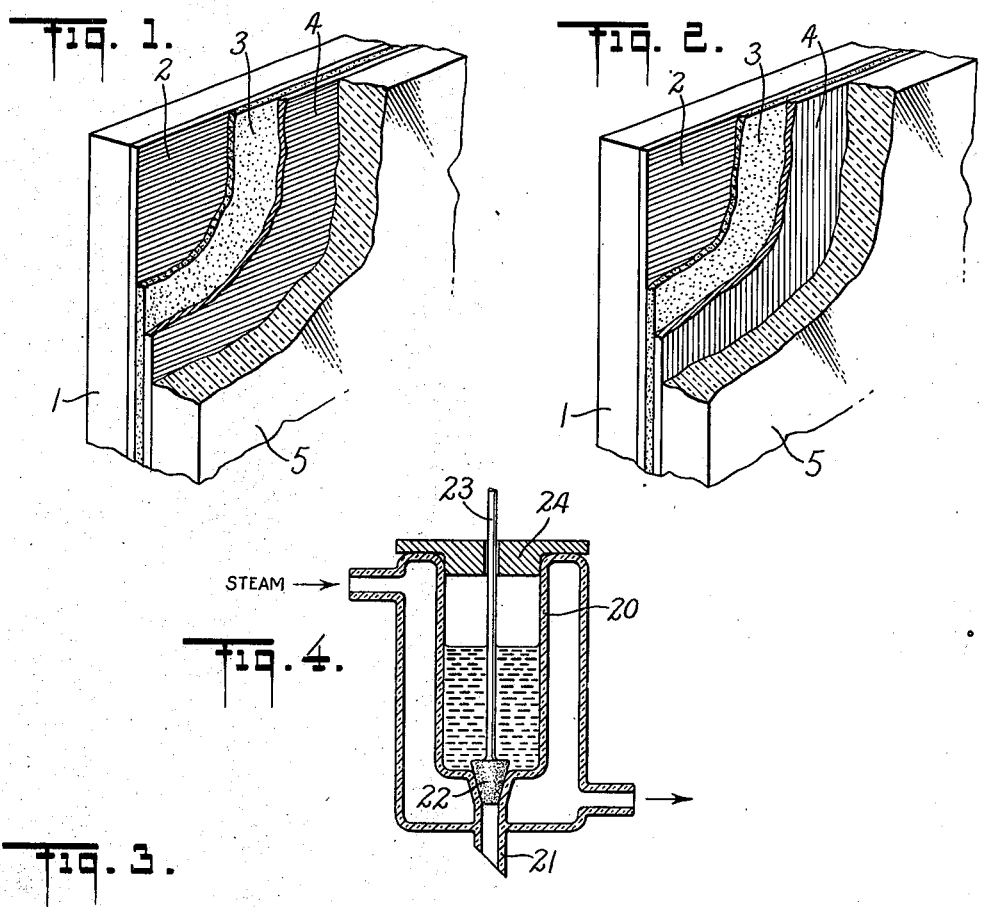
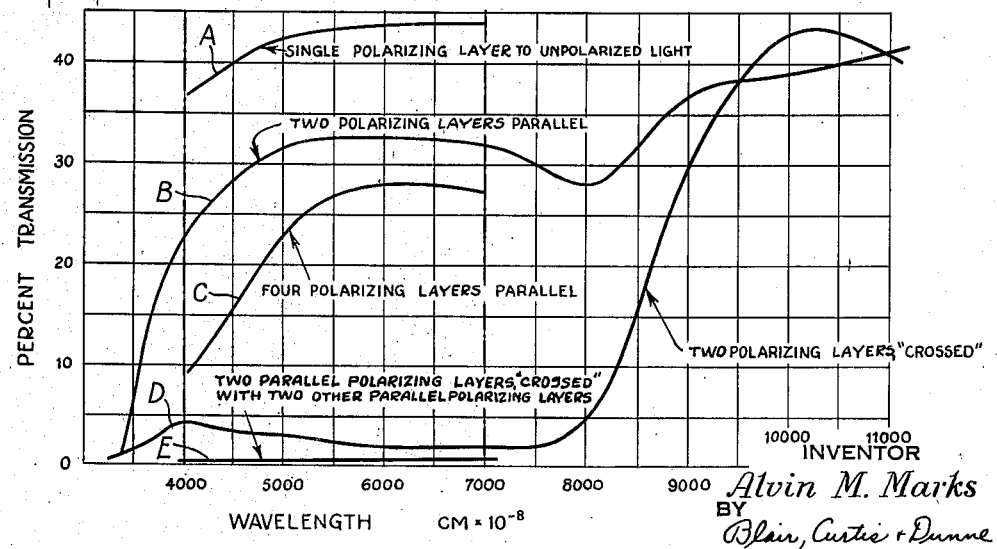
INVENTOR
Alvin M. Marks
BY
Blair, Curtis + Dunne
ATTORNEYS Patented Nov. 5, 1940

2,220,111

UNITED STATES PATENT OFFICE 2,220,111

POLARIZING DEVICE

Alvin M. Marks, Whitestone, N. Y.

Application December 3, 1936, Serial No. 113,957

3 Claims. (Cl. 88—65)

This invention pertains to optical devices having anisotropic properties.

One of the objects of the invention is to provide new and improved optically useful devices by combining several transparent anisotropic mediums to produce a device having the desired anisotropic characteristics.

Another object is to provide new and improved light polarizing devices.

Other objects will be in part obvious and in part pointed out hereinafter.

In the accompanying drawing, which illustrate some of the various forms of optical devices embodying my invention and apparatus adapted to be used in making said devices, Figure 1 is an isometric view of a portion of an optically useful device embodying my invention, parts being broken away for greater clearness;

Figure 2 is a similar view of a modification;

Figure 3 shows the light transmitting characteristics of a device such as shown in Figure 1; and Figure 4 is a sectional view of one form of cement-holding apparatus which may be used in carrying out certain method steps of the invention.

Corresponding reference characters refer to corresponding parts throughout the several views of the drawing.

In my co-pending application Serial No. 662,090, filed March 22, 1933, now issued into Patent No. 2,104,949 on January 11, 1938, there are described light polarizing devices or media comprising isotropic transparent elements, as of glass, supporting on one surface an anisotropic structure or film adapted to plane polarize light. By anisotropic film I mean an element or layer of material which has different optical effects on light vibrations resolved along two axes mutually at about 90° and being in the plane of the film. By optical effects is meant such properties as percent transmission of incident light, percent reflection, absorption, polarization, etc. Since optical effects may vary with the wave lengths the term anisotropic includes dichroic. But an anisotropic film, as the term is herein used, is limited to a film wherein the optical effects are produced by the properties of the substance comprising the film and not by the shape of the substance as in a lens system.

I have found that unexpected new and useful results are obtained by combining such light polarizing devices to operate as a single device. Thus an effective device is produced by permanently and securely joining together against movement two such anisotropic films with, for example, a transparent cementing medium which serves to hold the films together and to provide a substantially continuous optical body therebetween.

As described in the above mentioned application, a single polarizing plate may comprise a glass plate on one side of which is provided an anisotropic film in the form of a crystalline structure of a subtsance, such as iodocinchonidinesulphate or iodoquininesulphate, capable of plane polarizing light. For the purposes of the present invention two such plates are preferably secured together by suitable means such as a transparent thermo-plastic cement, and when so cemented provide a composite device which, depending on the arrangement, functions as a single light polarizing medium. In securing such plates together the crystalline films are preferably placed face to face so that in the resulting device only the glass surfaces are exposed. The glass provides a smoother exposed protecting surface than is furnished by covering the film of a single plate with a lacquer coating as heretofore suggested.

Referring to Figure 1, there is shown a composite light polarizing device for plane polarizing light passing through it and comprising transparent isotropic plates of glass, 1 and 5, supporting anisotropic crystalline structures as layers or film 2 and 4 respectively of iodocinchonidinesulphate, which films may be coated with a protective lacquer. The two films are cemented together face to face by an interposed layer of a "dry" thermoplastic cement 3, such as Canada balsam.

It is noted that the axes of the two anisotropic crystalline films are parallel so that the resultant thickness of the light polarizing substance is that of the combined thicknesses of the films 2 and 4. Further, the films of this structure are protected by the glass supports against the weather and friction wear.

The increased net thickness of the anisotropic film increases the quality and efficiency of the polarizer for many purposes. Referring to Figure 3 (curves A, B and C), as the number of layers of the iodocinchonidinesulphate film are increased, the proportionate amount of light transmitted in the blue band is reduced, and, referring to curves D and E, as the number of layers is increased, the light that is transmitted in the blue band is more highly polarized. This behavior toward blue light takes place without producing as great a proportionate change in the transmissions of the wave lengths of the rest of the visible spectra. So, although too thin a film of iodocinchonidinesulphate does not polarize light in the blue band satisfactorily for some purposes, the effectiveness of the film in polarizing light is improved and made more uniform as the thickness or number of layers is increased. This effect is shown in curve E which shows the uniformity of extinction obtained by crossing two double plates.

However, merely increasing the thickness in a single film introduces difficulties inasmuch as the coefficients of expansion of the supporting medium (glass) and the crystalline structure may not be the same. So, as the thickness of the film of a polarizing plate is increased, the stresses set up by changes in temperature of the plate are increased. But, with the present invention, the effect of greater thickness is obtained by combining separate thin films without introducing disturbances due to temperature changes.

Another advantage obtained by combining two such anisotropic films is that if between glass plates defects, such as minute holes, occur in the polarizing films of the individual plates, the defects are largely eliminated inasmuch as the probability of two such defects being exactly superimposed is slight. Hence by mounting one plate on another not only is a more satisfactory polarizer secured, but the efficiency in the manufacture of the plates is increased since plates can be used together which separately could not be used.

Referring to Figure 2, there is shown another embodiment of the invention similar in some respects to that shown in Figure 1. In this embodiment, however, the polarizing substance is iodocinchonidinesulphate and the axes of the crystalline structures are crossed at 90°. As shown in Figure 3, curve D, this composite plate, as shown in Figure 1, when crossed with a similar composite plate passes approximately no light in the visible spectrum but transmits a comparatively large amount of light in the infra red band of the spectrum beyond $9000 \times 10^{-8}$ cm. wave length (9000 Å.). This optical effect of the device makes it useful as an infra red filter, i. e., one to filter out visible light but to pass a band of the infra red light.

The axes of the crystal structures of the iodocinchonidinesulphate films may be placed at any desired angle between 0° and 90° to vary the percent transmission of the visible light. In this way neutral filters may be manufactured, and the percent transmission controlled in the manufacture, making it readily possible to manufacture sets of filters, the individual filters having different degrees of transmission.

Thus it is seen that a composite plate having the optical characteristics desired may be formed by selecting the optical characteristics of the individual plates and by arranging the relationship of the individual plates.

These anisotropic film-bearing plates may be cemented together by depositing on the film side of one of the plates a suitable quantity of molten Canada balsam; then heating said combination, for example on a steam plate, and thereafter pressing the second plate as rapidly as possible into contact with the first to extrude all excess cement so that the cement remaining fills a minimum of space between the plates. Upon cooling, the Canada balsam hardens, cementing the plates together.

I have found it desirable to have the cementing substance free from foreign particles and from air bubbles inasmuch as air bubbles caught between the plates may not be pushed out in the cementing process, and if present between the plates would cause optical defects due to the pronounced difference in the indices of refraction of the air and plates. With further regard to the matter of refraction, the film of cement is made as thin as possible, and a cement is chosen which has as nearly as possible the same index of refraction as does the substance of the anisotropic films.

The above process may be carried out for small operations by heating the balsam in apparatus such as shown in Figure 4, which comprises a steam-jacketed container 20 having an outlet 21 tapered to provide a drop-forming tube. The tube 21 is normally stoppered by a stopper 22 operated by means of a handle 23 extending up through the container and through a cover plate 24 covering the container.

This apparatus may be made out of glass and the stopper 22 may be ground into its seat. When steam is supplied to the jacket, the Canada balsam is melted and air bubbles rise to the top. After the bubbles have disappeared, by lifting up the stopper the desired amount of Canada balsam may be dropped on to a plate to be cemented to another plate. The stopper also acts as a plunger to force out the desired amount of Canada balsam when pushed down.

The use of a thermo-plastic cement such as "dry" Canada balsam is generally preferable to one employing a solvent, since it does away with the likelihood of the solvent attacking the crystalline structure. Further, the product is complete upon cooling and no long drying procedure is necessary.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. A light polarizing device comprising two transparent supporting plates respectively supporting a substantially continuous crystalline layer capable of at least partially plane polarizing light, said transparent plates being permanently cemented together with the crystalline layers facing one another by cement between the crystalline layers, said cement being isotropic and transparent and of substantially the same index of refraction as that of the crystalline layers and being a thin film whereby angular deviation of light by refraction passing from one crystalline layer to the other is reduced to a minimum.

2. A light polarizing device comprising two transparent supporting plates each supporting a substantially continuous crystalline layer which is thin, and capable of at least partially plane polarizing light, means for securing said supporting plates rigidly together with the crystalline layers in juxtaposition and facing each other including a thin layer of a substance having substantially the same index of refraction as the crystalline layers separating said crystalline layers whereby the angular deviation of light by refraction passing from one crystalline layer to another is reduced to a minimum.

3. An infra red light filter comprising two transparent supporting plates each respectively supporting a substantially continuous crystalline layer of primary iodocinchonidinesulphate, said transparent plates being permanently cemented together by cement between the crystalline layers, and with the crystalline layers facing one another, and with the light polarizing axes of the crystalline layers crossed, said cement being isotropic and transparent and of substantially the same index of refraction as that of the crystalline layers and being a thin film whereby angular deviation of light by refraction passing from one crystalline structure to the other is reduced to a minimum.

ALVIN M. MARKS.